(12) United States Patent
Suciu et al.

(10) Patent No.: US 8,210,800 B2
(45) Date of Patent: Jul. 3, 2012

(54) INTEGRATED ACTUATOR MODULE FOR GAS TURBINE ENGINE

(75) Inventors: Gabriel L. Suciu, Glastonbury, CT (US); Brian D. Merry, Andover, CT (US); Christopher M. Dye, South Windsor, CT (US); James S. Elder, South Windsor, CT (US)

(73) Assignee: United Technologies Corporation, Windsor, CT (US)

( * ) Notice: Subject to any disclaimer, the term of this patent is extended or adjusted under 35 U.S.C. 154(b) by 1056 days.

(21) Appl. No.: 12/138,370

(22) Filed: Jun. 12, 2008

(65) Prior Publication Data

US 2009/0317229 A1    Dec. 24, 2009

(51) Int. Cl.
*F01D 17/00* (2006.01)

(52) U.S. Cl. ............... 415/145; 415/149.4; 415/148; 415/150

(58) Field of Classification Search .......... 415/65, 415/66, 68, 69, 160–161, 148, 149.4, 150, 415/151, 145, 159
See application file for complete search history.

(56) References Cited

U.S. PATENT DOCUMENTS

| | | | |
|---|---|---|---|
| 4,102,595 A | 7/1978 | Wibbelsman | |
| 4,280,678 A | 7/1981 | Roberts | |
| 4,720,237 A | 1/1988 | Weiner et al. | |
| 4,794,760 A | 1/1989 | White | |
| 5,042,245 A | 8/1991 | Zickwolf, Jr. | |
| 5,117,625 A | 6/1992 | McArthur et al. | |
| 5,123,240 A | 6/1992 | Frost et al. | |
| 5,137,230 A | 8/1992 | Coffinberry | |
| 5,549,448 A * | 8/1996 | Langston | 415/149.4 |
| 5,845,482 A | 12/1998 | Carscallen | |
| 5,943,856 A | 8/1999 | Lillibridge et al. | |
| 6,048,171 A | 4/2000 | Donnelly et al. | |
| 6,122,905 A | 9/2000 | Liu | |
| 6,536,201 B2 | 3/2003 | Stuttaford et al. | |
| 6,557,400 B2 | 5/2003 | Xiong et al. | |
| 6,742,324 B2 | 6/2004 | Bacheider et al. | |
| 6,755,025 B2 | 6/2004 | Eleftheriou et al. | |
| 6,779,346 B2 | 8/2004 | Nichols et al. | |
| 6,823,675 B2 | 11/2004 | Brunell et al. | |
| 6,899,513 B2 | 5/2005 | Eleftheriou | |
| 6,921,244 B2 | 7/2005 | Johnson | |
| 6,928,818 B1 * | 8/2005 | Arnold et al. | 60/602 |
| 6,981,842 B2 | 1/2006 | D'angelo et al. | |
| 7,069,728 B2 | 7/2006 | Bruno et al. | |
| 7,240,691 B2 | 7/2007 | Bevan | |
| 7,249,929 B2 | 7/2007 | Cummings et al. | |
| 7,266,941 B2 | 9/2007 | Eleftheriou et al. | |
| 7,850,419 B2 * | 12/2010 | Vrljes et al. | 415/145 |

* cited by examiner

Primary Examiner — Dung A. Le
(74) Attorney, Agent, or Firm — Carlson Gaskey & Olds, P.C.

(57) ABSTRACT

An actuator module for a gas turbine engine includes a multiple of actuators mounted within a common actuator housing.

17 Claims, 8 Drawing Sheets

INTEGRATED ACTUATOR MODULE FOR GAS TURBINE ENGINE

BACKGROUND

The present invention relates to a gas turbine engine integrated actuator module.

Gas turbine engine performance is typically enhanced through a variable compressor vane system to effectively utilize engine power capacity and enhance transitional performance. The variable compressor vane system typically includes a low pressure compressor variable vane set and a high pressure variable compressor vane set. Each variable vane in each set is rotated in unison through a crank arm linkage. Each crank arm in a set is linked together through a unison ring located circumferentially around the respective compressor case. Each unison ring is rotated by an individual respective actuator to operate the respective variable vane set.

Although effective, each actuator is individually mounted in various locations about the engine case structure such that each actuator requires a separate individual mount platform and hardware. Relatively significant amounts of space within the engine core nacelle and weight redundancies may thereby be generated.

SUMMARY

An actuator module for a gas turbine engine according to an exemplary aspect of the present invention includes: an actuator housing; a first actuator mounted within the actuator housing, the first actuator operable to actuate at least one low pressure compressor variable vane set; and a second actuator mounted within the actuator housing, the second actuator operable to actuate at least one high pressure compressor variable vane set.

A gas turbine engine according to an exemplary aspect of the present invention includes: an engine static structure; a multiple of low pressure compressor variable vane sets supported by the engine static structure; a multiple of high pressure compressor variable vane sets supported by the engine static structure; an actuator housing mountable to the engine static structure; a first actuator mounted within the actuator housing, the first actuator operable to actuate at least one of the multiple of low pressure compressor variable vane sets; and a second actuator mounted within the actuator housing, the second actuator operable to actuate at least one of the multiple of high pressure compressor variable vane sets.

A method of actuating a variable vane system for a gas turbine engine according to an exemplary aspect of the present invention includes: actuating a multiple of variable vane sets with a respective multiple of actuators, each of the multiple of actuators mounted within a common actuator housing.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

In the foregoing paragraphs, each paragraph begins with the respective figures being identified which are about to be explained. If no figures are called out at the beginning of the paragraph, it should be inferred that the same figures are to be referenced as in the preceding paragraph(s).

Figure 1A:
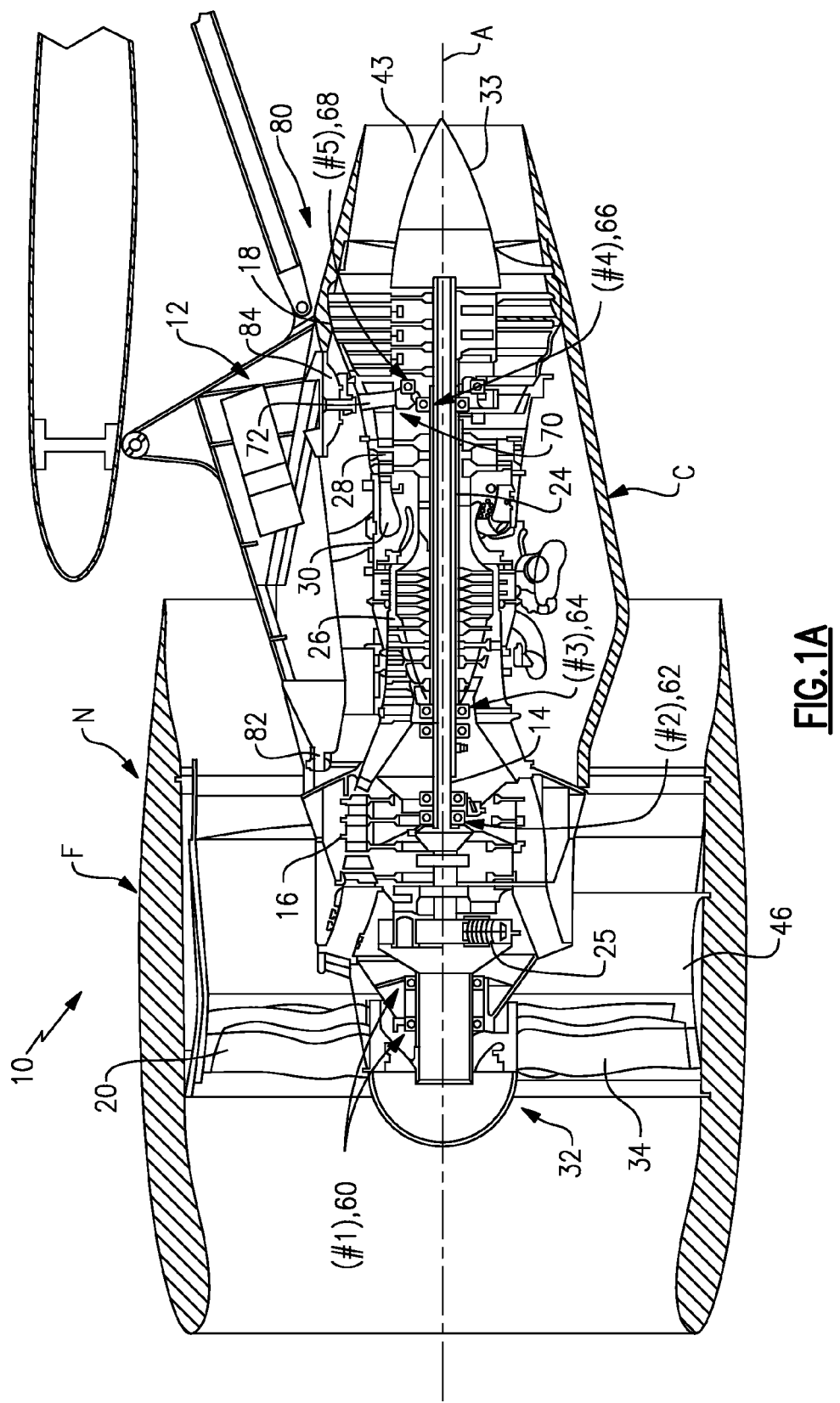
FIG. 1A is a general schematic sectional view through a gas turbine engine along the engine longitudinal axis.

FIG. 1A illustrates a general partial fragmentary schematic view of a gas turbine engine 10 suspended from an engine pylon 12 within an engine nacelle assembly N as is typical of an aircraft designed for subsonic operation.

The engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train 25.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine. In one disclosed embodiment, the bypass ratio is greater than ten (10:1), the fan diameter is significantly larger than that of the low pressure compressor 16. The gear train 25 may be an epicycle gear train such as a planetary gear system or other gear system with a gear reduction ratio approximately 2.5:1. It should be understood, however, that the above parameters are only exemplary of one embodiment of a geared architecture engine and that the present invention is applicable to other gas turbine engines including direct drive turbofans.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 where it is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25. A core engine exhaust exits the core nacelle C through a core nozzle 43 defined between the core nacelle C and a tail cone 33.

Figure 1B:
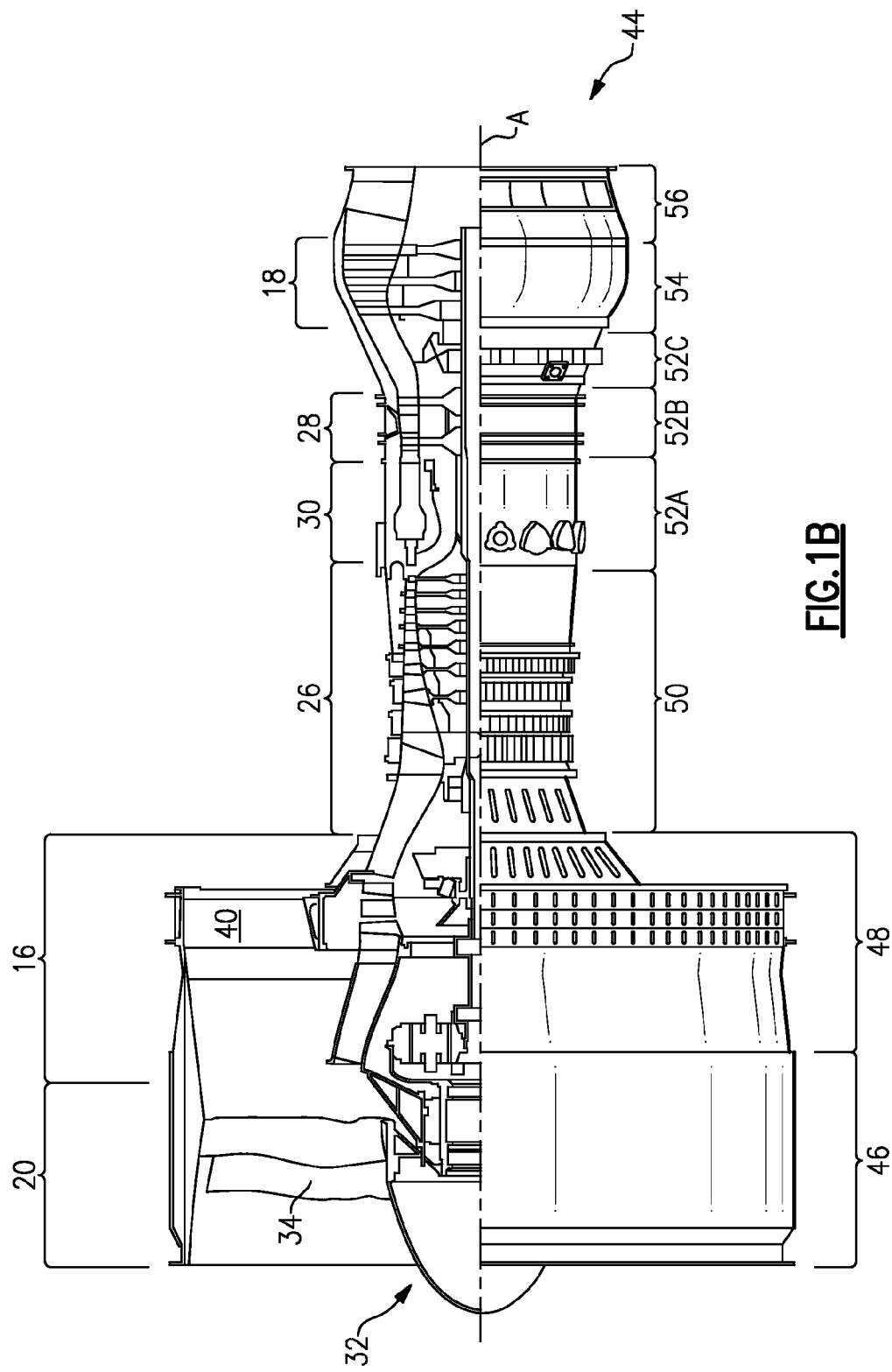
FIG. 1B is a general sectional view through a gas turbine engine along the engine longitudinal axis illustrating an engine static structure case arrangement on the lower half thereof.

Referring to FIG. 1B, the engine static structure 44 generally has sub-structures including a case structure often referred to as the engine backbone. The engine static structure 44 generally includes a fan case 46, an intermediate case (IMC) 48, a high pressure compressor case 50, a combustor case 52A, a high pressure turbine case 52B, a thrust case 52C, a low pressure turbine case 54, and a turbine exhaust case 56 (FIG. 1B). Alternatively, the combustor case 52A, the high pressure turbine case 52B and the thrust case 52C may be combined into a single case. It should be understood that this is an exemplary configuration and any number of cases, and case arrangements may be utilized.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending struts 40 which radially span the core engine case structure and the fan section 20. The multiple of circumferentially spaced radially extending struts 40 are often generically referred to as Fan Exit Guide Vanes (FEGVs).

Referring to FIGS. 1A and 1B, the engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low spool 14 is axially located generally within the intermediate case (IMC) 48. The #2 LPC bearing 62 reacts thrust. A #3 HPC bearing 64 which rotationally supports the high spool 24 and also reacts thrust. The #3 HPC bearing 64 is also axially located generally within the IMC 48 just forward of the high pressure compressor case 50. A #4 bearing 66 which rotationally supports a rear segment of the low spool 14 reacts only radial loads. The #4 bearing 66 is axially located generally within the thrust case 52C in an aft section thereof. A #5 bearing 68 rotationally supports the rear segment of the low spool 14 and reacts only radial loads. The #5 bearing 68 is axially located generally within the thrust case 52C just aft of the #4 bearing 66. It should be understood that this is an exemplary configuration and any number of bearings may be utilized.

The #4 bearing 66 and the #5 bearing 68 are supported within a mid-turbine frame (MTF) 70 to straddle radially extending structural struts 72 which are preloaded in tension. The MTF 70 provides aft structural support within the thrust case 52C for the #4 bearing 66 and the #5 bearing 68 which rotatably support the spools 14, 24.

A dual rotor engine such as that disclosed in the illustrated embodiment typically includes a forward frame and a rear frame that support the main rotor bearings. The intermediate case (IMC) 48 also includes the radially extending struts 40 which are generally radially aligned with the #2 LPC bearing 62. It should be understood that various engines with various case and frame structures will benefit from the present invention.

The turbofan gas turbine engine 10 is mounted to aircraft structure such as an aircraft wing through a mount system 80 attachable by the pylon 12. The mount system 80 includes a forward mount 82 and an aft mount 84. The forward mount 82 is secured to the IMC 48 and the aft mount 84 is secured to the MTF 70 at the thrust case 52C. The forward mount 82 and the aft mount 84 are arranged in a plane containing the axis A of the engine 10.

Figure 2A:
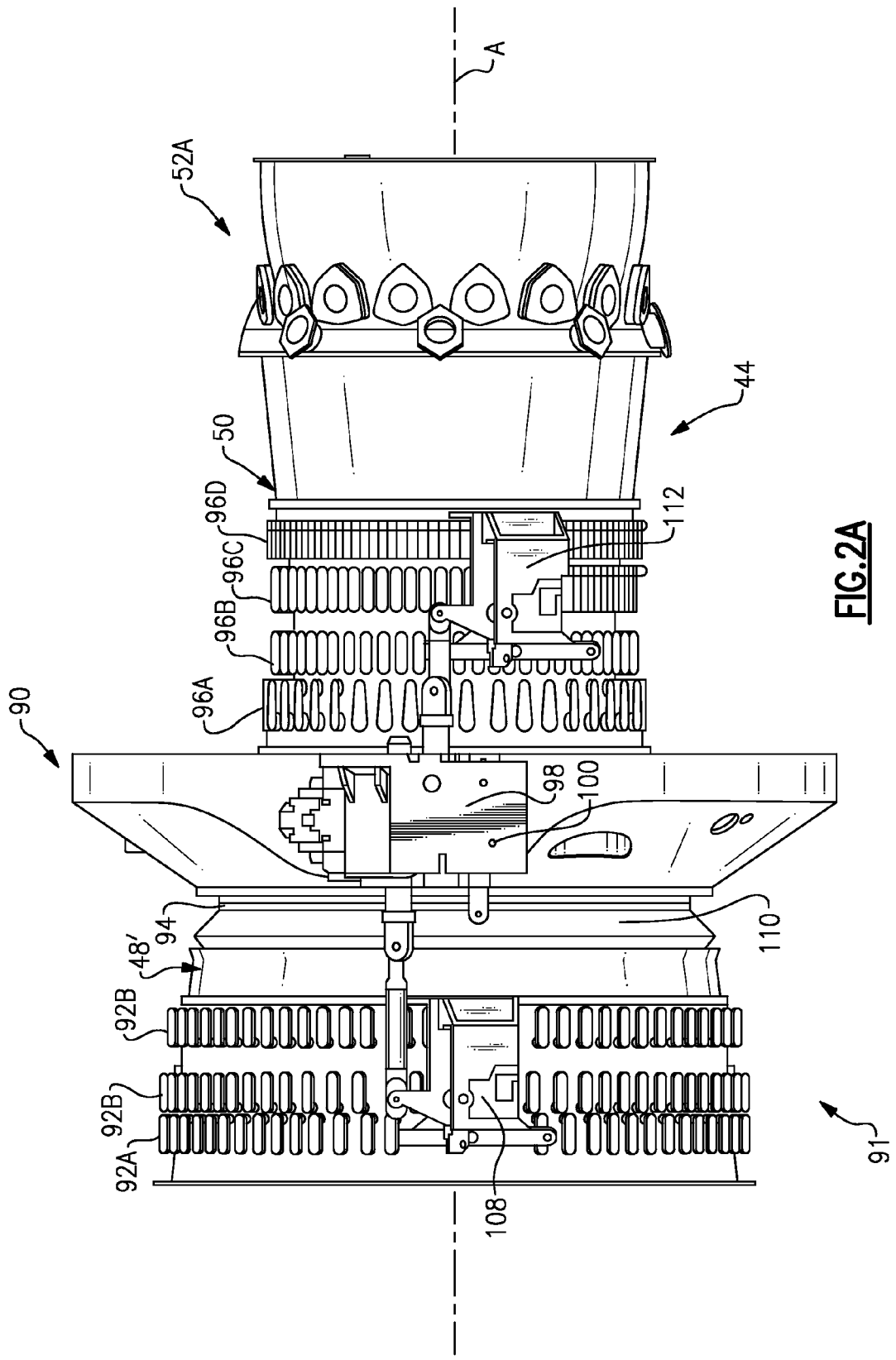
FIG. 2A is a side partial sectional view of a gas turbine engine illustrating an engine static structure case arrangement with an accessory gearbox mounted thereto.

Referring to FIGS. 1B and 2A, an accessory gearbox 90 may be mounted to the intermediate case (IMC) 48. That is the accessory gearbox 90 may be mounted to the intermediate case (IMC) 48 or be formed integral therewith. It should be understood that the accessory gearbox 90 may be mounted anywhere on the engine static structure 44. In one non-limiting embodiment the accessory gearbox 90 is located axially between the low pressure compressor 16 and the high pressure compressor 26.

Figure 2B:
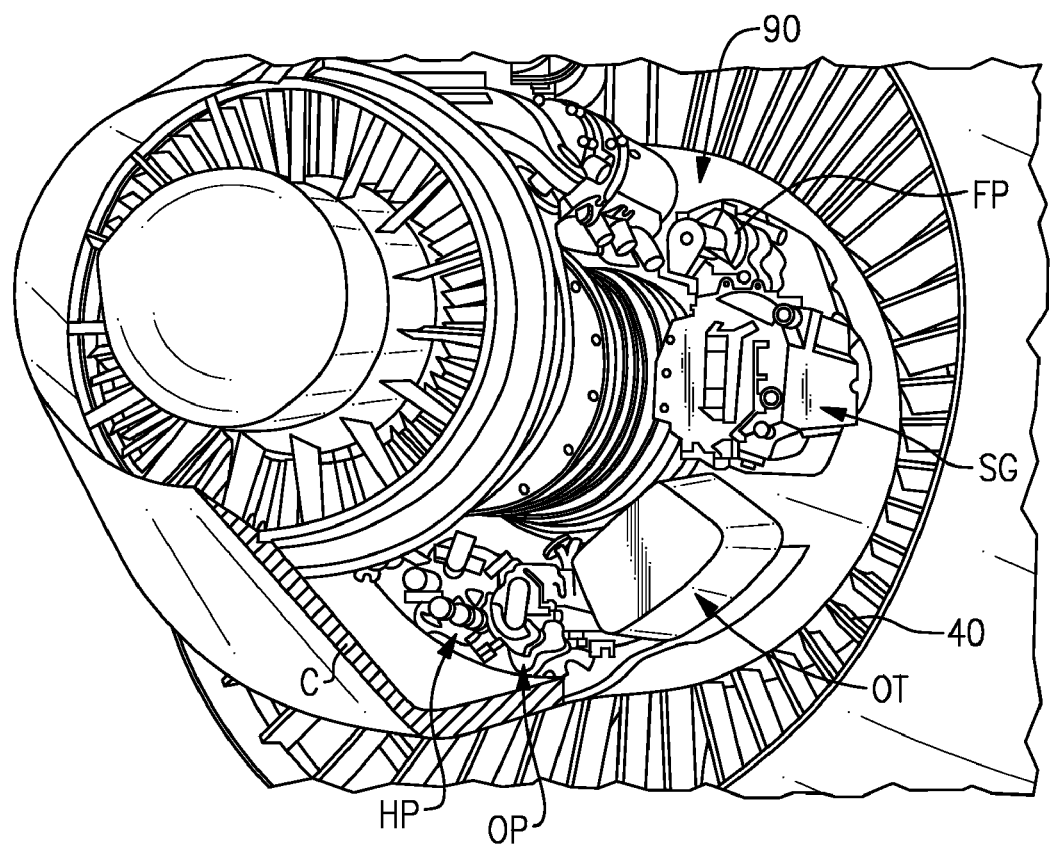
FIG. 2B is a perspective view of a gas turbine engine looking forward to illustrate the piggy-back of accessory components onto the accessory gearbox.
Figure 2C:
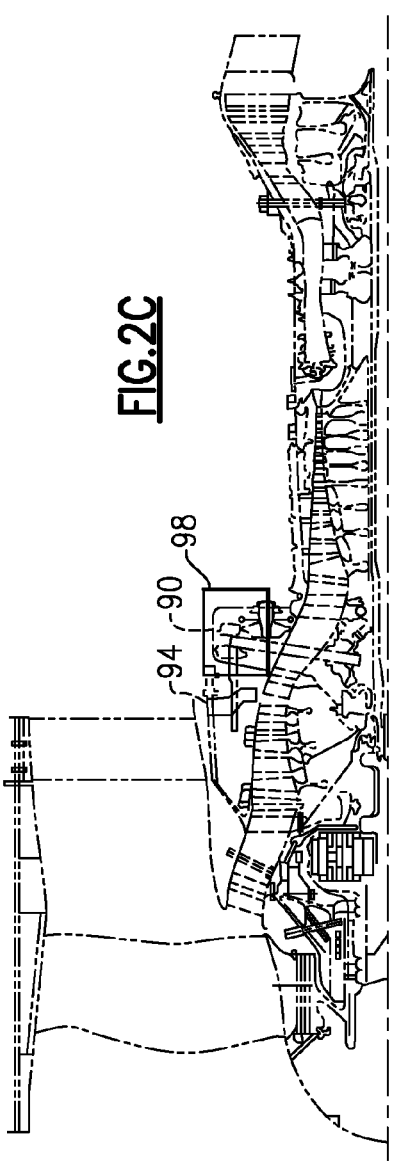
FIG. 2C is a general sectional view through the gas turbine engine along the engine longitudinal axis illustrating the accessory gearbox and actuator module location.

Referring to FIGS. 2B and 2C, the accessory gearbox 90 provides significant radial area within the core nacelle (C) inboard of the struts 40 to support accessory engine components such as, for example only, a starter/generator (SG), a hydraulic pump (HP), an oil pump (OP), an integrated oil tank (OT), a fuel pump (FP) and others which thereby saves weight and space within the core nacelle (C). It should be understood, that any number and type of accessory components are readily mountable on or adjacent to the accessory gearbox 90.

Figure 2D:
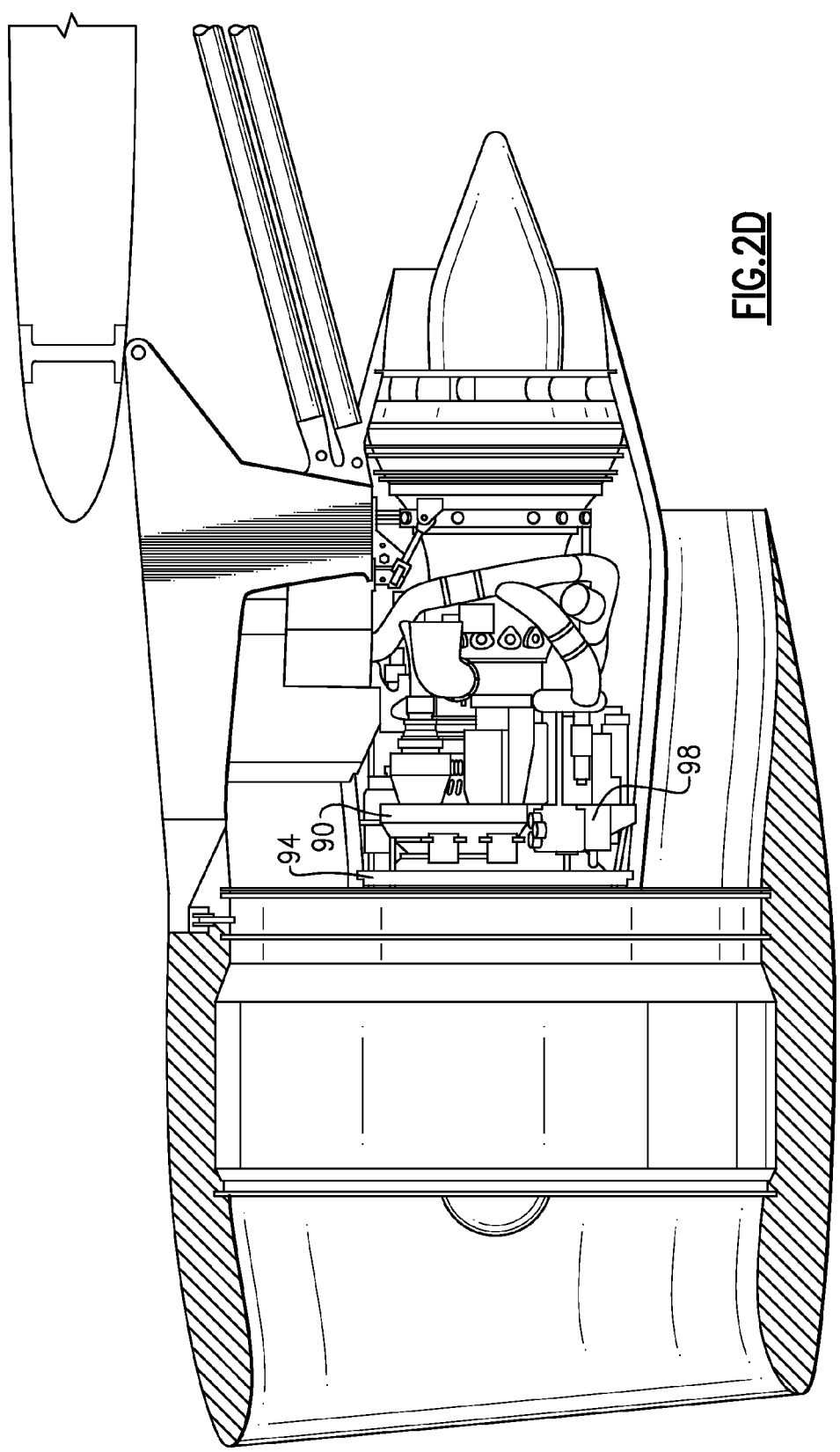
FIG. 2D is a partial sectional view through a nacelle structure of a gas turbine engine illustrating the accessory gearbox and actuator module location.
Figure 2E:
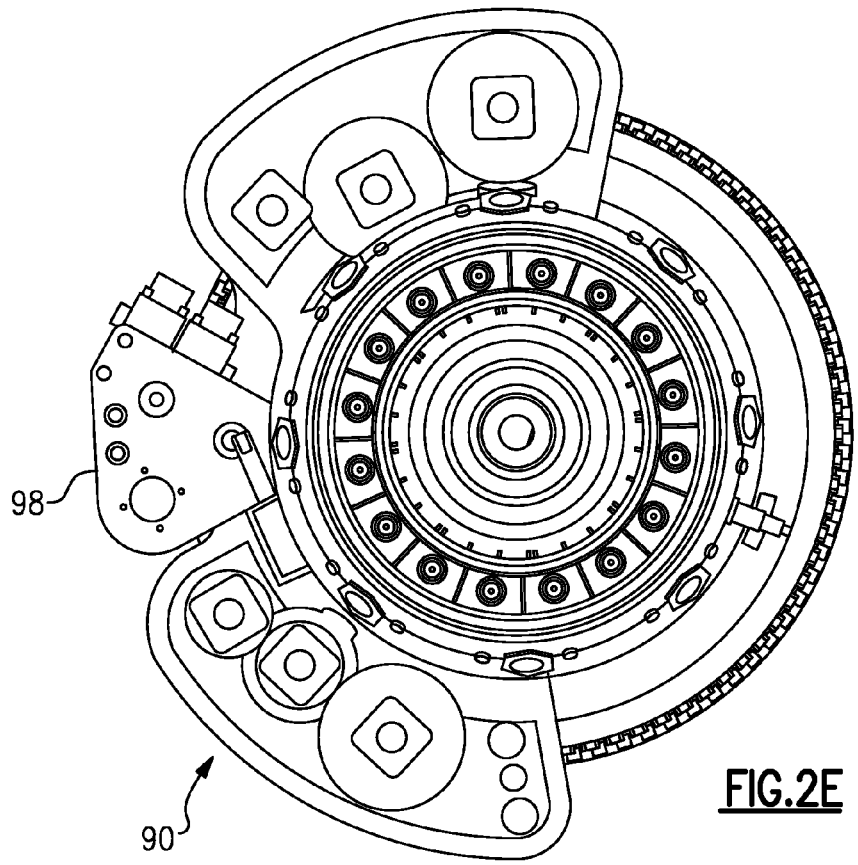
FIG. 2E is a rear view of an engine static structure case arrangement illustrating the actuator module location between lobes of the accessory gearbox.
Figure 2F:
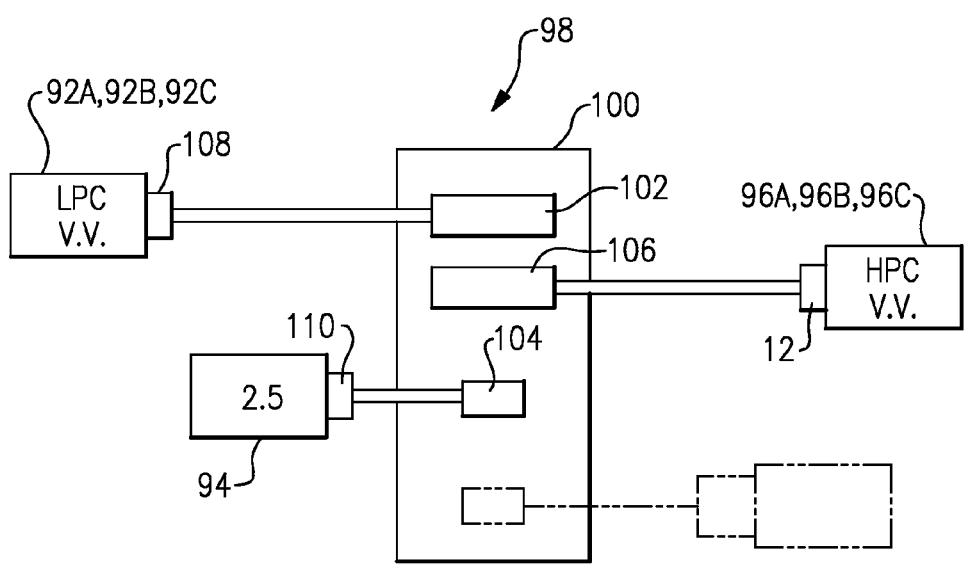
FIG. 2F is a schematic view of the actuator module.

Referring to FIGS. 1B and 2F, the engine static structure 44 includes a variable compressor vane system 91 which may include a multiple of low pressure compressor variable vane sets 92A, 92B, 92C and a multiple of high pressure compressor variable vane sets 96A, 96B, 96C, 96D. The engine static structure 44 may also include a bleed valve system such as a 2.5 bleed valve actuator system 94.

The intermediate case (IMC) 48 supports the multiple of low pressure compressor variable vane sets 92A, 92B, 92C. The intermediate case (IMC) 48 may also support the 2.5 bleed valve actuator system 94. It should be understood that the 2.5 bleed valve actuator system 94 is located generally between the $2^{nd}$ and $3^{rd}$ stage, but other bleed valve actuator systems may alternatively or additionally benefit herefrom. The high pressure compressor case 50 supports the multiple of high pressure compressor variable vane sets 96A, 96B, 96C, 96D. It should be understood that any number of compressor variable vane sets may alternatively or additionally be provided.

Referring to FIGS. 2D, 2E, and 2F, an actuator module 98 is mounted between lobes of the accessory gearbox 90 in one non-limiting embodiment. The actuator module 98 generally includes a common actuator housing 100 having a multiple of actuators 102, 104, 106 contained therein. Each actuator 102, 104, 106 such as a hydraulic, pneumatic, or electric actuator, for example, drives the respective low pressure compressor variable vane sets 92A, 92B, 92C; 2.5 bleed valve actuator system 94; and the high pressure compressor variable vane sets 96A, 96B, 96C, 96D .

Each actuator 102, 104, 106 may be connected to various linkages and be actuated independently as required through a control. In one non-limiting embodiment, the actuator 102 drives a linkage system 108 such as a bell crank mechanism to operate the low pressure compressor variable vane sets 92A, 92B, 92C. The actuator 104 drives a linkage system 110 such as an actuator ring to operate the 2.5 bleed valve actuator system 94. The actuator 106 drives a linkage system 112 such as a bell crank mechanism to operate the high pressure compressor variable vane sets 96A, 96B, 96C, 96D. It should be understood that any multiple of actuators may be contained within the actuator module 98 to operate various additional or alternative engine systems.

Figure 3A:
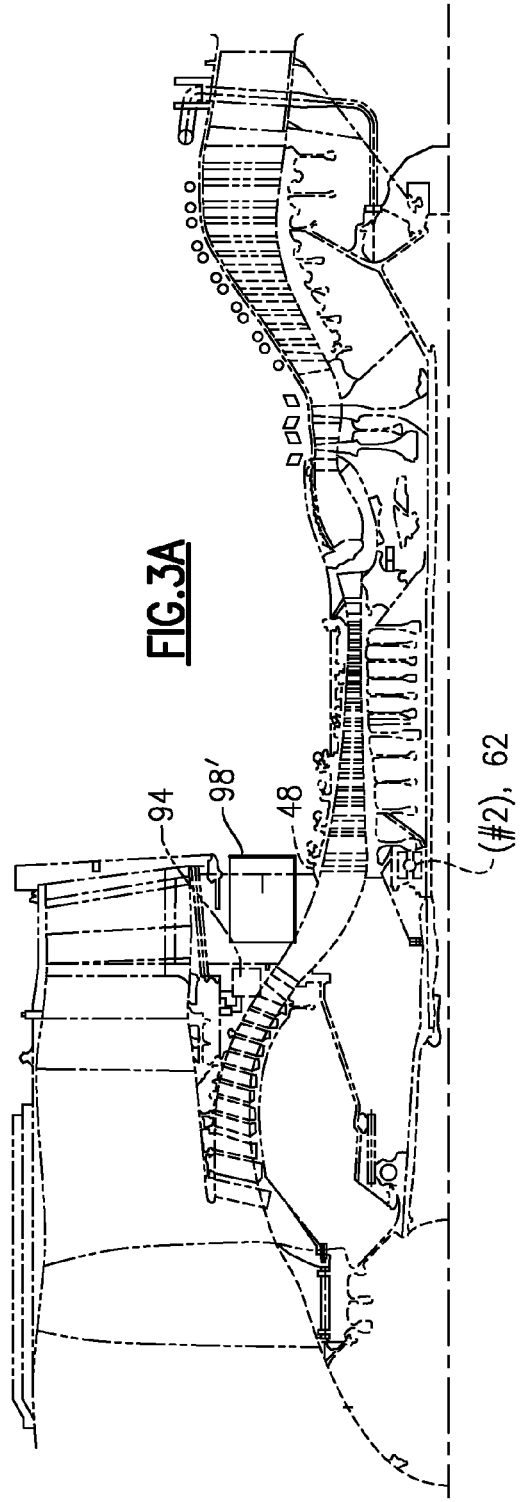
FIG. 3A is a general sectional view through the gas turbine engine along the engine longitudinal axis illustrating another actuator module location for a gas turbine engine without an accessory gearbox.
Figure 3B:
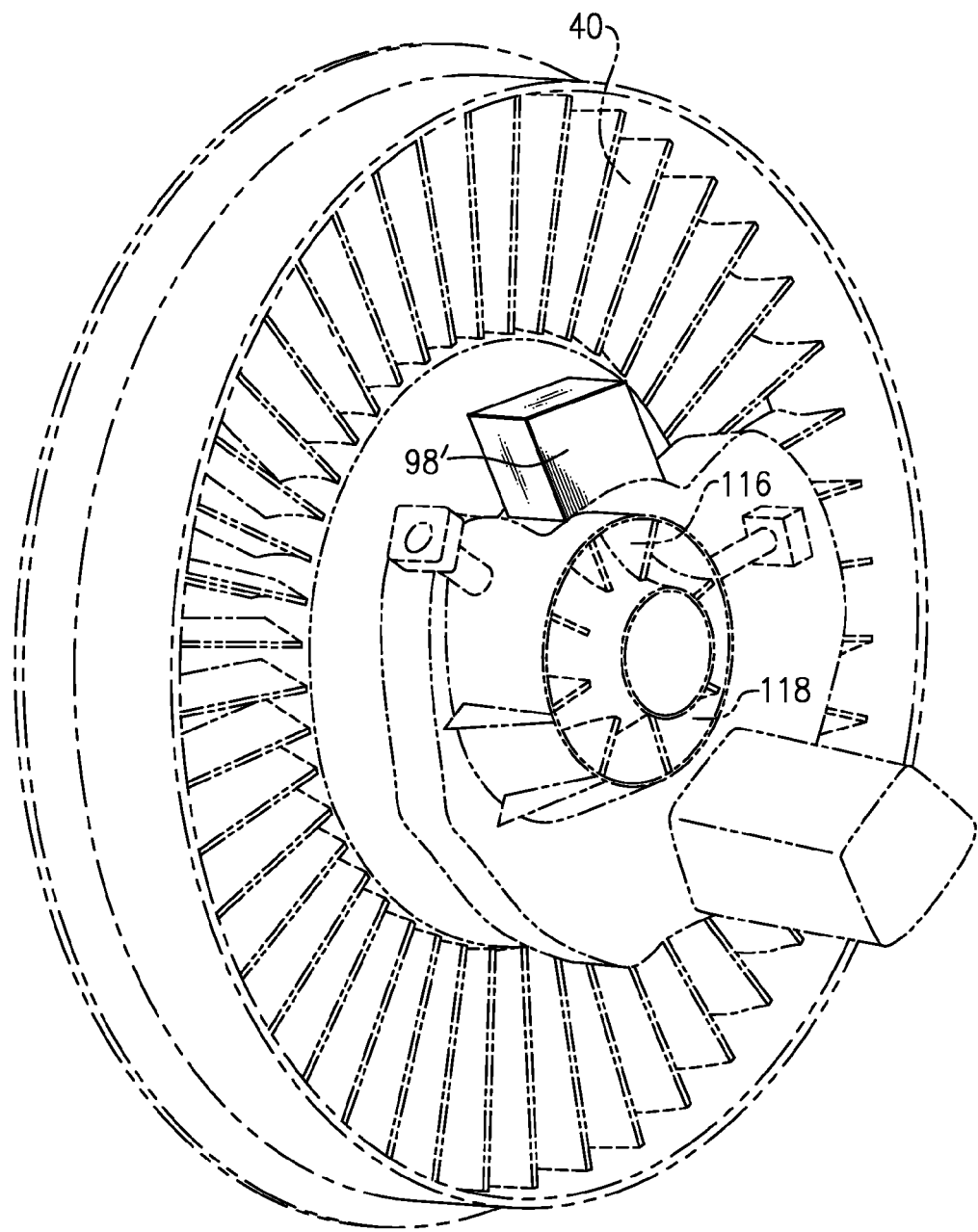
FIG. 3B is a perspective view of the intermediate case (IMC) of the gas turbine engine of FIG. 3A illustrating the actuator module location mounted directly to the IMC.

Referring to FIGS. 1B, 3A, and 3B, an actuator module 98' is mounted directly to the intermediate case (IMC) 48 in another non-limiting embodiment. The actuator module 98' is located axially between the low pressure compressor 16 and the high pressure compressor 26. The actuator module 98' is also radially located in an annulus defined between the multiple of circumferentially spaced radially extending struts 40 and a multiple of struts 116 within an inner frame 118 of the intermediate case (IMC) 48. The inner frame 118 may provide a forward structural support for the #2 LPC bearing 62 which rotatably support the spools 14, 24 within the intermediate case (IMC) 48 which also includes the radially extending struts 40. It should be understood that various engines with various case and frame structures will benefit herefrom.

Integration of the compressor actuators within the actuator module reduces actuator space; eliminates redundant mounting material and parts; and reduces maintenance schedule time and complexity. Each actuator may be serviced independently by removing the individual actuator parts from the housing or by removing and replacing the actuator module as a unit.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations are possible in light of the above teachings. Non-limiting embodiments are disclosed herein, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An actuator module for a gas turbine engine comprising:
    an actuator housing;
    a first actuator mounted within said actuator housing, said first actuator operable to actuate at least one low pressure compressor variable vane set; and
    a second actuator mounted within said actuator housing, said second actuator operable to actuate at least one high pressure compressor variable vane set.

2. The actuator module as recited in claim 1, further comprising a third actuator mounted within said actuator housing, said third actuator operable to actuate a bleed valve system.

3. The actuator module as recited in claim 2, wherein said bleed valve system comprises a 2.5 bleed valve actuator system.

4. The actuator module as recited in claim 1, wherein said actuator housing is mountable to an accessory gearbox.

5. The actuator module as recited in claim 1, wherein said actuator housing is mountable to an engine static structure.

6. The actuator module as recited in claim 1, wherein said actuator housing is mountable to an intermediate case (IMC).

7. A gas turbine engine comprising:
    an engine static structure;
    a multiple of low pressure compressor variable vane sets supported by said engine static structure;
    a multiple of high pressure compressor variable vane sets supported by said engine static structure;
    an actuator housing mountable to said engine static structure;
    a first actuator mounted within said actuator housing, said first actuator operable to actuate at least one of said multiple of low pressure compressor variable vane sets; and
    a second actuator mounted within said actuator housing, said second actuator operable to actuate at least one of said multiple of high pressure compressor variable vane sets.

8. The engine as recited in claim 7, wherein said actuator housing is mountable to said engine static structure axially between a low pressure compressor and a high pressure compressor.

9. The engine as recited in claim 7, wherein said actuator housing is mountable within an annulus defined between a multiple of circumferentially spaced radially extending struts and a multiple of struts within an inner frame of an intermediate case (IMC) of said engine static structure.

10. The engine as recited in claim 7, wherein said actuator housing is mountable within an annulus defined between a multiple of circumferentially spaced radially extending struts and a multiple of struts within an inner frame of said engine static structure.

11. The engine as recited in claim 7, further comprising an accessory gearbox mounted to said engine static structure, said actuator housing mountable to said accessory gearbox.

12. A method of actuating a variable vane system for a gas turbine engine comprising:
    actuating a multiple of variable vane sets with a respective multiple of actuators, each of the multiple of actuators mounted within a common actuator housing.

13. A method as recited in claim 12, further comprising:
    mounting the actuator housing to an engine static structure axially between a low pressure compressor and a high pressure compressor.

14. A method as recited in claim 12, further comprising:
    mounting the actuator housing to an accessory gearbox mounted to an engine static structure.

15. A method as recited in claim 14, further comprising:
    mounting the actuator housing between lobes of the accessory gearbox.

16. A method as recited in claim 12, further comprising:
    mounting the actuator housing to an intermediate case (IMC) of an engine static structure.

17. A method as recited in claim 12, further comprising:
    mounting the actuator housing within an annulus defined between a multiple of circumferentially spaced radially extending struts and a multiple of struts within an inner frame of an intermediate case (IMC) of an engine static structure.

\* \* \* \* \*